United States Patent
Bosma et al.

(10) Patent No.: US 6,639,612 B2
(45) Date of Patent: Oct. 28, 2003

(54) AD HOC CHECK BOX SELECTION

(75) Inventors: John Hans Handy Bosma, Cedar Park, TX (US); Keith Raymond Walker, Austin, TX (US); Yen-Fu Chen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 09/974,900

(22) Filed: Oct. 11, 2001

(65) Prior Publication Data

US 2003/0085881 A1 May 8, 2003

(51) Int. Cl.[7] .................................................. G09G 5/00

(52) U.S. Cl. ....................................... 345/769; 345/764

(58) Field of Search ................................ 345/769, 764, 345/810, 821–824, 856, 859, 157

(56) References Cited

U.S. PATENT DOCUMENTS

| | | | |
|---|---|---|---|
| 5,959,627 A | | 9/1999 | Duwaer et al. |
| 6,100,887 A | * | 8/2000 | Bormann et al. ........... 345/764 |
| 6,104,398 A | | 8/2000 | Cox, Jr. et al. |
| 6,252,592 B1 | | 6/2001 | King et al. |
| 6,535,229 B1 | * | 3/2003 | Kraft ........................ 345/764 |

* cited by examiner

*Primary Examiner*—Sy D. Luu
(74) *Attorney, Agent, or Firm*—John R. Biggers; David A. Mims, Jr.; Biggers & Ohanian, PLLC

(57) ABSTRACT

A method for toggling check box status, implemented as a software program installed and operating on a computer comprising a computer processor coupled to computer memory. Embodiments of the invention include detecting a touch event on a check box, toggling the status of the check box, and repeatedly, for a multiplicity of repetitions, carrying out the steps of detecting a drag event for each additional check box onto which a user drags the pointer, wherein the user drags the pointer onto at least one additional check box, and toggling the status of each additional touch box for which a drag event is detected.

11 Claims, 2 Drawing Sheets

AD HOC CHECK BOX SELECTION

BACKGROUND OF THE INVENTION

1. Field of the Invention

The field of the invention is data processing, or, more specifically, methods, systems, and products for ad hoc check box selection in graphical user interfaces.

2. Description of Related Art

The role of check boxes in user interface design is problematic for users making ad hoc selections of computer data. The typical use of check boxes is to allow users to select multiple items in a list. Prior to this invention, users generally selected multiple data items using check boxes in one of several ways, including, for example: 'select all,' 'clear all,' 'toggle all,' 'click individual items,' and 'select all in a group.'

While each of these methods allows selection of multiple data items, each is problematic. Viewed from an efficiency perspective, selection is especially problematic in cases where users make ad hoc choices from a check box list. Consider the hypothetical example of a 100-item list, in which the user desires to select 57 of the items. The hypothetical list can be described as "ad hoc" in that no preexisting logical grouping is sufficient to allow selection of items with a single user action. To select the 57 items, a user could 'select all,' then clear 43 individual items by clicking each, resulting in a total of 44 clicks to select the 57 items. Or the user could select 43 items the user does not want, then 'toggle all,' thus selecting the preferred items, again with a total of 44 clicks. Alternatively, the user could click 57 items by single-clicking each item desired. If there is a 'select all in groups' available in the user's GUI, then the number of clicks is dependent on a predefined logical system. In any event, the user would not be able to select 57 ad hoc items with a single click-and-drag operation.

Ad hoc selection is important because users have their own reasons for selecting data in a list; their preferences cannot always be predicted. Moreover, in most cases user preferences in selecting should not be limited to predefined logical groupings. Any system that limits the user to preset groupings undermines the goal of allowing maximal user flexibility, which is the point of check box lists in the first place. While each of the above methods in combination allows for ad hoc selection, each is unable to provide an efficient means of selecting data in an ad hoc fashion.

The 'select all' option includes too many items when the user seeks to make ad hoc selections. Obviously, the 'clear all' option selects too few, since no selection is made. The 'toggle all' requires a number of individual clicks and is dependent on preexisting selections. Likewise, the 'click individual items' option requires individual clicks for each item.

The 'select all in group' option has its own inefficiencies. First, 'select all in group' requires development effort to determine preexisting groups of check box items.

Second, regardless of how well the groups are formulated, ad hoc selection still requires single clicking after a group is selected. That is, the 'select all in group' option provides access to structured means for selection of data, which is the opposite of ad hoc selection. While the 'select all in group' option could shorten the number of clicks to make a particular set of ad hoc selections, that is not its purpose. Moreover, selecting by group can in some cases actually increase the number of clicks required to choose ad hoc items, depending on how closely the groups mirror the choices intended by the user.

Some attempts have been made to deal with these efficiency problems. For example, the invention described in IBM's U.S. Pat. No. 6,104,398, "Fast and efficient means for grouped object selection and deselection," attempts to overcome inefficiencies in item lists requiring users to select or deselect individual items. The '398 patent proposed a means for aggregating check box and other data items into predetermined groups so that a single operation could select multiple items. While this was a useful step forward, the method of the '398 patent required such groupings to be determined on a predefined basis. The problem of ad hoc selection of both contiguous and non-contiguous data in a list remained to be solved. Moreover, the method of the '398 patent required the instantiation of new controls external to the check box list itself, or in the alternative that some check boxes control others, thus expanding the number of items in a list. A method that constrained selection controls to the minimum necessary to complete the task was still needed.

The minimum number of selection controls needed to complete an ad hoc selection is equal to the number of items in a list. In other words, there is no need to instantiate controls external to a list if the list is to be chosen in an ad hoc fashion. Fundamentally, the problem with check box selection prior to this invention was in dealing with ad hoc selection of data. That is, in any list of computerized data relying on check boxes, users may need to select both contiguous and non-contiguous data. To select on an ad hoc basis means either checking individual items or relying on groups structured in an a priori fashion. A system that addresses these problems should allow users to select among items with the minimum number of operations necessary. For the purpose of a check box list, that minimum number of operations to select one or more items on an ad hoc basis is a single click-and-drag operation. Prior to this invention, no method has existed to allow for ad hoc selection of check box items with a single click-and-drag operation.

In fact, structured groupings substitute a priori judgments made by those who define the structure for judgments made by users, potentially imposing new inefficiencies. Selecting a structured group may require de-selection by the user. Ad hoc selection, then, does not imply a lack of structure in selections, although such may be the case, but instead that users impose their own structure on information. The user's definition of the user's intended list structure is generally by definition more efficient than judgments external to the user. It is effectively an unreliable accident if a predefined grouping aids ad hoc selection.

The present invention is a significant departure from previous approaches. For example, the "Official Guidelines for User Interface Developers and Designers" issued by Microsoft (Redmond, Wash.: Microsoft, 1999) specifies that check box controls are selected on an individual basis:

"When the user clicks a check box with the primary mouse button, either in the check box or on its label, the check box is selected and its state is toggled. When the user presses the mouse button, the input focus moves to the control and the check box displays its pressed appearance. Like option buttons and other controls, if the user moves the pointer off the check box or its label while pressing the mouse button, the control's appearance returns to its original state and retains the input focus. The state of the check box does not change until the mouse button is released. To change a control's setting, the pointer must be over the check box or its label when the user releases the mouse button."

In summary, this means that for check box controls relying on mouse clicks, check box selection occurs on an individual basis. The user must click on each item s/he wishes to select; the state of selections is not transferred from one check box to another. If the mouse moves off the check box, the check box reverts to its original state and the user cannot continue to select by hovering over other check box items. The limitations of prior approaches, then, are traceable to their reliance on mouse clicks as such.

SUMMARY

Exemplary embodiments of the invention include a method for toggling check box status, implemented as a software program installed and operating on a computer comprising a computer processor coupled to computer memory, the computer comprising also a computer display which itself further comprises a graphical user interface ("GUI"). Exemplary embodiments typically include a method implemented on the GUI, the GUI operated by a user using a pointing device, the pointing device having a capability of indicating a touch on a check box, the pointing device having associated with it through the GUI a pointer displayed upon the GUI and responsive to physical motion of the pointing device, and the GUI having displayed upon it a set of check boxes comprising a multiplicity of check boxes, wherein each check box has a status comprising an indication whether a check box is selected. Exemplary embodiments typically include detecting a touch event on a check box, toggling the status of the check box, and repeatedly, for a multiplicity of repetitions, carrying out the steps of detecting a drag event for each additional check box onto which a user drags the pointer, wherein the user drags the pointer onto at least one additional check box, and toggling the status of each additional touch box for which a drag event is detected.

In exemplary embodiments of the invention, for at least a portion of the repetitions, one or more further check boxes are typically positioned upon the display screen in the GUI between two of the additional check boxes, where a path along which the pointer drags between the two additional check boxes lies outside the further check boxes, and where the statuses of the further check boxes remain unaffected. In some exemplary embodiments, detecting a touch event typically includes changing a pointer device status to 'active' while a pointer for the device is positioned on the check box.

In exemplary embodiments, the pointing device is typically a mouse, a stylus pressed upon a touch sensitive pad, or a finger pressed upon a touch sensitive screen. In other exemplary embodiments the check box has a GUI image and toggling the status of the check box typically includes changing the GUI image of the check box to indicate a change in the status of the check box.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
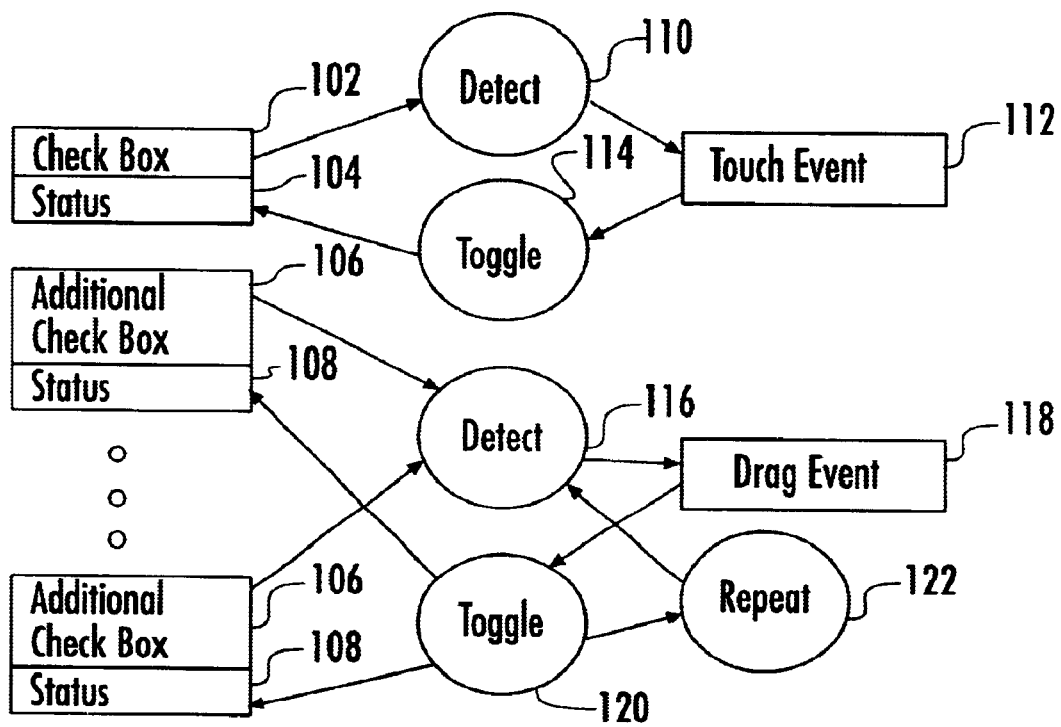
FIG. 1 is a control flow diagram illustrating typical exemplary embodiments of the present invention.

The present invention is described to a large extent in this specification in terms of methods for ad hoc check box selection in graphical user interfaces. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"GUI" means graphical user interface.

"Pointer device" means any device coupled to a computer and having the capabilities of indicating pointer device status and moving a pointer displayed on a GUI on the computer. Examples of pointer devices useful with various embodiments of the invention include mice, fingers pressed upon touch sensitive screens, and styli pressed on touch sensitive pads. Other pointer devices will occur to those of skill in the art, and the use of all such pointer devices is well within the scope of the present invention. Pointer device statuses include a status of 'active.' One of the events that will toggle a check box occurs, for example, when a pointer device status is changed to 'active' while the pointer is on the check box. In the case of mice, 'active' status means 'mouse down.' Pointers moveable on GUIs, in the case of mice, include mouse pointers. In the case of a stylus used with a pressure sensitive pad, 'active' typically means that the stylus is pressed upon the pad.

"Drag" means moving a pointer on a GUI, by use of a pointing device, while the pointing device status is 'active.' In the case of mice, 'drag' means moving the mouse pointer with a mouse button held down, that is, while the mouse status is 'mouse down.' In the case of a stylus used with a pressure sensitive pad, 'drag' often means moving a pointer by pressing the stylus on the pad and moving the stylus while maintaining the pressure of the stylus on the pad.

DETAILED DESCRIPTION

Embodiments of the present invention provide efficient selection and deselection of ad hoc data elements represented by check boxes on a GUI form using a single click and drag operation. Embodiments of the present invention generally preserve the ability to select or deselect individual items in a data set. This invention addresses many of the limitations of the prior art by utilizing mouse movement, not merely mouse clicks, as a means of controlling check box state.

Consider the example of a user whose interface relies on a primary mouse button setup. When a user clicks on a single check box item in a list, that item is selected or deselected depending on the previous state of the item. Unlike prior art check box lists, however, if the user drags outside of the check box in an embodiment of the present invention, the item typically would remain selected. The user could then drag the mouse pointer over additional check box items in a list. Those items selected by dragging the mouse pointer would be toggled in typical example embodiments of the present invention.

If the user wished to omit items from selection or deselection, in typical operation of most embodiments of the present invention, the user would need only to drag the mouse past or outside the check boxes for the items to be omitted. In a check box list arranged vertically, the user would drag the mouse pointer past the items by moving the pointer to the left or right and then up or down, so as to bypass check boxes not to be affected.

A release or click of the primary mouse button on another screen area, any screen area outside a check box, in typical operation of many embodiments of the present invention, discontinues the click-and-drag operation. A click of the primary mouse button on another check box in the list would reinitiate the process, thus allowing for selection and de-selection of individual items. The invention thus reduces the number of operations required to make ad hoc selections from a check box list to the theoretical minimum.

Turning now to FIG. 1, a first example embodiment of the present invention is seen illustrated as a method for toggling check box status. The example embodiment of FIG. 1 includes detecting (110) a touch event on a check box (102) and toggling (114) the status (104) of the check box. The example embodiment of FIG. 1 also includes repeatedly (122), for a multiplicity of repetitions, detecting (116) a drag event (118) for each additional check box (106) onto which a user drags a pointer, wherein the user drags the pointer onto at least one additional check box, and toggling (120) the status (108) of each additional touch box for which a drag event is detected.

Typical embodiments of the invention are implemented as software programs installed and operating on computers comprising computer processors coupled to computer memory. Embodiments typically include computer displays which in turn further comprises graphical user interfaces or "GUIs." Typical exemplary embodiments are implemented on or within GUIs, where the GUIs are operated by a user using a pointing device, the pointing device having a capability of indicating a touch on a check box, the pointing device having associated with it through the GUI a pointer displayed upon the GUI and responsive to physical motion of the pointing device. In this sense, in typical example embodiments, a "pointer" is a graphical analog of a pointer device, the pointer being displayed on a display screen with a GUI display object, such as a GUI window or dialog box, the pointer moving upon the display in dependence upon a user's physical movement of a corresponding pointer device. In the example of a mouse, the mouse pointer moves on a display screen as a user moves the mouse on a mouse pad.

In typical example embodiments of the present invention, a GUI has displayed upon it a set of check boxes comprising a multiplicity of check boxes, wherein each check box has a status comprising an indication whether a check box is selected. That is, check boxes typically have at least the two statuses 'selected' and 'not selected.' Check boxes having the status 'not selected' are sometimes referred to as 'deselected.'

Figure 2:
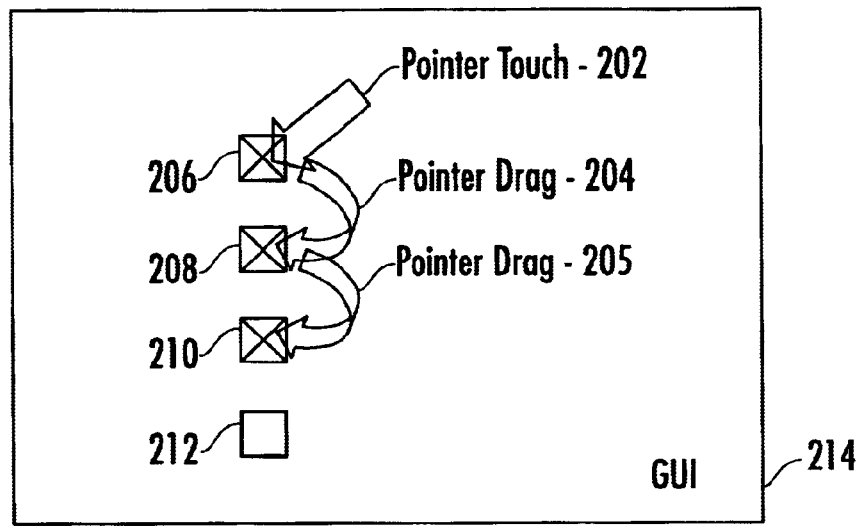
FIG. 2 is a diagram of events in a graphical user interface illustrating operation of typical exemplary embodiments of the present invention.

FIG. 2 illustrates an example of operation of a further exemplary embodiment. The status of the check boxes in the illustrated embodiment are illustrated with 'Xs.' Selected check boxes are illustrated with Xs, as those at references 206, 208, and 210 in FIG. 2. Deselected check boxes are illustrated without Xs, as the check box at reference (212).

The check boxes in the example embodiment of FIG. 2 began the illustrative process deselected. In the process illustrated in FIG. 2, a pointer touch event (202), such as a mouse down event on check box (206) has been detected and the status of check box (206) has been toggled from 'not selected' to 'selected,' as indicated by the 'X' in check box (206). Further in the process illustrated in FIG. 2, a pointer drag event (204), such as, for example, a mouse drag from check box (206) to check box (208) has been detected and the status of check box (208) has been toggled from 'not selected' to 'selected,' as indicated by the 'X' in check box (208). Still further in the process illustrated in FIG. 2, a further pointer drag event (205), such as, for example, a mouse drag from check box (208) to check box (210) has been detected and the status of check box (210) has been toggled from 'not selected' to 'selected,' as indicated by the 'X' in check box (210).

The example of FIG. 2 illustrates the repetitive quality of typical embodiments of the present invention in that additional check box statuses are toggled as a pointer is dragged repeatedly from check box to check box. FIG. 2 also illustrates that the status of a check box (212) is unaffected if no pointer event is detected for that check box. That is, neither a mouse down event nor a mouse drag event is detected for check box (212) in the example embodiment of FIG. 2, and the status of check box (212) therefore remains as it was at the beginning of the illustrative process, 'not selected.'

Figure 3:
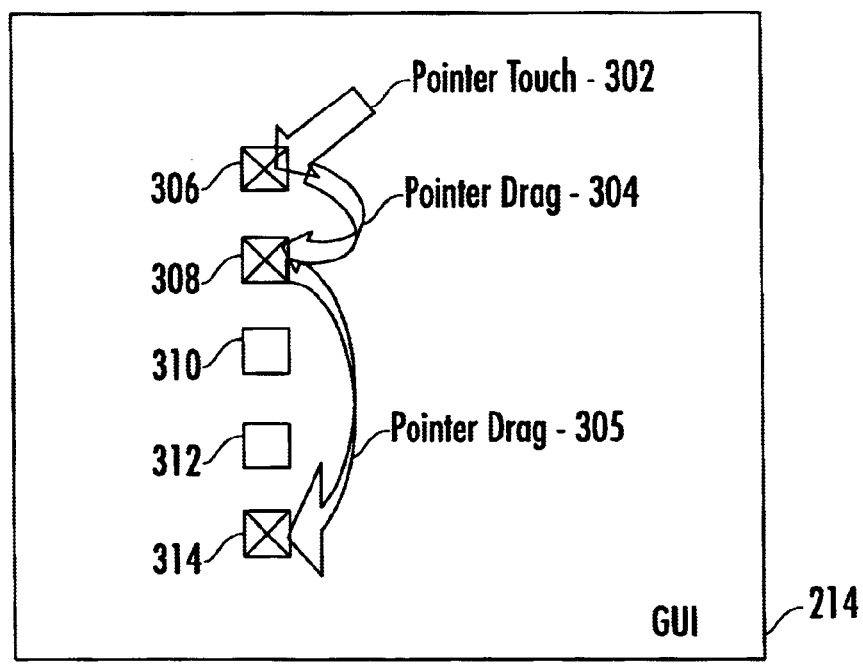
FIG. 3 is a further diagram of events in a graphical user interface illustrating operation of typical exemplary embodiments of the present invention.

A still further example embodiment of the invention is illustrated in FIG. 3. Like the process illustrated in FIG. 2, the example process illustrated in FIG. 3 includes repeated drag events (304, 305). In the example of FIG. 3, however, for at least a portion of the repetitions, one or more further check boxes (310, 312) are positioned upon the display screen in the GUI (214) between two of the additional check boxes (308, 312), wherein a path (304) along which the pointer drags between the two additional check boxes lies outside the further check boxes, whereby the statuses of the further check boxes remain unaffected.

More specifically, the check boxes in the example embodiment of FIG. 3 began the illustrative process deselected. In the process illustrated in FIG. 3, a pointer touch event (302), such as a mouse down event on check box (306) has been detected and the status of check box (306) has been toggled from 'not selected' to 'selected,' as indicated by the 'X' in check box (306). Further in the exemplary process illustrated in FIG. 3, a pointer drag event (304), such as, for example, a mouse drag from check box (306) to check box (308) has been detected and the status of check box (308) has been toggled from 'not selected' to 'selected,' as indicated by the 'X' in check box (308). Still further in the process illustrated in FIG. 3, a further pointer drag event (305), such as, for example, a mouse drag from check box (308) to check box (314) has been detected and the status of check box (314) has been toggled from 'not selected' to 'selected,' as indicated by the 'X' in check box (314).

The example of FIG. 3 also illustrates the repetitive quality of typical embodiments of the present invention in that additional check box statuses are toggled as a pointer is dragged repeatedly from check box to check box. FIG. 3 also illustrates that statuses of check boxes (310, 312) are unaffected if no pointer event is detected for them. That is, neither a mouse down event nor a mouse drag event is detected for check boxes (310) and (312) in the example embodiment of FIG. 3, and the status of check boxes (310) and (312) therefore remains as it was at the beginning of the illustrative process, 'not selected.'

In the example of FIG. 2, no drag event was detected for check box (212) because in the repetitive dragging of the pointer from check box (206) to check box (210), the pointer never reached check box (212). In the example of FIG. 3, no drag event was detected for check boxes (310) and (312) because in dragging the pointer from check box (308) to check box (314), the pointer was dragged around check boxes (310) and (312) without touching them or passing over them. FIGS. 2 and 3 taken together illustrate an important advantage of the present invention in that check box statuses are toggled in a completely ad hoc fashion just as fast as a user can think and move a pointer across a GUI display, toggling some check boxes by passing a pointer over them, leaving others unaffected by moving the pointer around them without passing over them.

It is useful to remember also that toggle functions work both ways. The illustrations of FIGS. 2 and 3 show check box statuses toggled from 'not selected' to 'selected.' Touch and drag events in embodiments of the present invention, however, also toggle statuses from 'selected' to 'not selected.' A user, upon realizing a mistake or changing her mind, merely drags back across a previous toggled check box to again toggle its status back to an earlier status, a factor that once again illustrates the usefulness of this invention, that a user can arrange ad hoc check box selections in any way desired as fast as the user can move a pointer.

In many embodiments of the present invention, detecting a touch event comprises changing a pointer device status to 'active' while a pointer for the device is positioned on the check box. Pointer device statuses typically include a status of 'active.' One of the events that often toggles a check box occurs, for example, when a pointer device status is changed to 'active' while a pointer is on the check box. In the case of mice, 'active' status means 'mouse down.' Pointers moveable on GUIs, in the case of mice, include mouse pointers and stylus pointers. In the case of a stylus used with a pressure sensitive pad, 'active' often means that the stylus is pressed upon the pad. Pointer devices include, for example, a mouse, a stylus pressed upon a touch sensitive pad, and a finger pressed upon a touch sensitive screen.

Even more specifically, many embodiments of the invention operate as illustrated in the following pseudocode:

```
//import the Java classes necessary to implement the ad hoc checkbox set.
import java.awt.*;
import java.awt.event.*;
import javax.swing.*;
import java.awt.event.MouseAdapter;
import java.awt.event.MouseMotionAdapter;
import java.awt.event.MouseEvent;
//begin CheckBoxDemo class -- main functionality embedded in this top-level class
public class CheckBoxDemo extends JPanel {
    JCheckBox oneBox;
    JCheckBox twoBox;
    JCheckBox threeBox;
    JCheckBox fourBox;
    public CheckBoxDemo( ) {
        //Create and name the checkboxes
        oneBox = new JCheckBox("one");
        twoBox = new JCheckBox("two");
        threeBox = new JCheckBox("three");
        fourBox = new JCheckBox("four");
            //Set the intial states of the checkboxes
            oneBox.setSelected(false);
        twoBox.setSelected(true);
        threeBox.setSelected(true);
        fourBox.setSelected(true);
    /** Register a listener/adapter object for each of the checkboxes. These
    listener/adapters wait for mouse events such as mouse presses, drags, and enters. We
    use adapters so that we don't have to specify all of the methods normally required of
    mouse listeners*/
            CheckBoxListener myListener = new CheckBoxListener( );
            oneBox.addMouseInputAdapter(myListener);
            twoBox.addMouseInputAdapter(myListener);
            threeBox.addMouseInputAdapter(myListener);
            fourBox.addMouseInputAdapter(myListener);
    //Put the check boxes in a column within the main panel so they
    //can be viewed in a user interface
        JPanel checkPanel = new JPanel( );
        checkPanel.setLayout(new GridLayout(0, 1));
        checkPanel.add(oneBox);
        checkPanel.add(twoBox);
        checkPanel.add(threeBox);
        checkPanel.add(fourBox);
```

-continued

```
        //Set layout and borders for the panel
        setLayout(new BorderLayout( ));
        add(checkPanel, BorderLayout.WEST);
        setBorder(BorderFactory.createEmptyBorder(20,20,20,20));
    }//end public CheckBoxDemo( )
    /** Create a CheckBoxListener class as a sub-class of the CheckBoxDemo class.
The CheckBoxListener class listens for certain mouse events that occur on the
checkboxes. This class extends and modifies the MouseInputAdapter class to
implement the selection and toggle functionality*/
    class CheckBoxListener extends MouseInputAdapter {
//Create a method that toggles selected states of checkboxes
        public void toggleBox( )         {
                if(source.getSelected(true))        {
                source.setSelected(false);
                break;
                }//end if(source.getselected(true))
                else if(source.getSelected(false))         {
                source.setSelected(true);
                }//end else if(source.getSelected(false))
        }//end public void toggleBox( )
//Create a generic method that checks the source of mouse events and passes that
source to a method that toggles checkboxes.
        public void toggleCheck( ) {
        if (source == oneBox) {
                    oneBox.toggleBox( );
        }else if (source == twoBox) {
                    twoBox.toggleBox( );
        }else if (source == threeBox) {
                    threeBox.toggleBox( );
        }else if (source == fourBox) {
                    fourBox.toggleBox( ) ;
        }
        }//end public void toggleCheck( )
//Listen for an initial mouse press event on a checkbox. Method only listens for
checkbox mouse press
        public void MousePressed(MouseEvent e) {
/** Create a source object for the mouseevent. Capture the source and test to find
which checkbox originated the event.*/
    Object source = e.getsource( );
                    CheckBoxListener.toggleBox( );
    }//end public void MousePressed(MouseEvent e)
//Listen for MouseDrag event. Create a source for that event.
        public void MouseDragged(MouseEvent g)        {
                Object source = f.getSource( );
        }//end public void MouseDragged(MouseEvent f)
//Listen for a MouseEnter event. Create a source for that event.
        public void MouseEnter(MouseEvent g)         {
                Object source = g.getSource( );
        }//end public void MouseEnter(MouseEvent g)
/** Create a method that compares MouseDrag and MouseEnter events to settle on a
source for events, these are then passed to the toggleCheck method, and then to the
toggleBox method.*/
        public void DragEnter( )                         {
                if(MouseDragged(MouseEvent f)) && (MouseEnter(MouseEvent g))
        {
                Object dragsource = f.getComponent( );
                Object entersource = g.getComponent( );
                    if(dragsource == entersource)        {
                    source == dragsource;
                    CheckBoxListener.toggleCheck( );
                    }//end if(dragsource == entersource)
                }//end if(MouseDragged(MouseEvent f)) &&
(MouseEnter(MouseEvent g))
        }//end public void DragEnter( )
}//end class CheckBoxListener extends MouseInputAdapter
//The main method for the class. Creates a frame and makes its contents visible
  public static void main(String s[ ]) {
    JFrame frame = new JFrame("CheckBoxDemo");
    frame.addWindowListener(new WindowAdapter( ) {
        public void windowClosing(WindowEvent e) {
            System.exit(0);
        }
    });
    frame.setContentPane(new CheckBoxDemo( ));
    frame.pack( );
    frame.setVisible(true);
        }//end public static void main(String s[])
}// end CheckBoxDemo class
```

In fact, the pseudocode comprises a fairly complete illustration of an example embodiment, including as it does, for example, import statements for Java classes that implement GUI elements and classes for listening for GUI events. The pseudocode example also provides for extensions of standard interface capabilities by adding capabilities for check boxes to listen for mouse events, selecting and deselecting check boxes, and communicating check box status to other application elements. Using Java AWT and Swing classes, for example, check box statements for extension capabilities create objects in background. Actual instantiations are accomplished in the example pseudocode, as in typical Java application, by implementation methods such as those in the public class CheckBoxDemo statements.

The pseudocode includes setting initial values for check boxes, which are any combination of selected and deselected items within a set of check boxes. In the example, this function is accomplished via the public CheckBoxDemo statements, along with a onebox statement, a twobox statement, and so on. The extended capabilities illustrated in the pseudocode include listeners for mouse down and mouse drag sequences or events that enable all check boxes to toggle their own state to selected or deselected status when the user drags a pressed mousebutton or pointer over a check box.

Even more specifically, the exemplary pseudocode implements these capabilities: An embodiment according to the pseudocode example creates and names check boxes and places them in a set. Such an embodiment also implements capabilities for each check box to listen to mouse events such as 'mouse key is pressed down,' 'mouse pointer is dragged,' and so on, and identify a check box as a source for such mouse events. Such an embodiment also has check box status toggling such that, after an initial mouse press for a pointer over a check box, subsequent dragging over check boxes toggles the status of those check boxes. On an initial mouse press, the source check box for the mouse press is toggled. On a subsequent mouse drag and entry over a checkbox, the checkbox dragged over is toggled. If a checkbox has already been dragged over but the mouse button has not been released, subsequent drag and entry over the same checkbox in a single user motion again toggles that checkbox. Releasing the mousebutton ends the sequence.

Embodiments of this invention have wide practical applications, including for example, the following additional examples:

Additional alternative example embodiment: An e-commerce application in which a user selects multiple items for an online shopping cart. Prior to this invention, a user would need to provide a single click for each item in a shopping cart list, or select all items in a list. If the user desires to make ad hoc selections, which is likely in an online purchasing context, the user would need to make single clicks for each selection. This invention greatly simplifies the process, thus allowing a single click-and-drag operation to make multiple purchases.

Additional alternative example embodiment: An online search engine in which user selects returned search items by choosing those answers best meeting the original query. This invention would facilitate quick selection of those items, allowing the search engine to narrow the search criteria by profiling the selected documents.

Additional alternative example embodiment: A database application that allows ad hoc selection of multiple items, and subsequent search on the subset of selected items. This invention would facilitate quick narrowing from a set of items returned from a database to a smaller subset. Such would be especially useful when selected items are linked in a sequence to a set of related data. For example, a real estate database may return a set of initial addresses. Users could select items on an ad hoc basic, and then be taken to data that characterizes those addresses.

A method that facilitates ad hoc selection of check box items using a single click-and-drag operation achieves many goals of contemporary computing. Such a method is consistent with user interface design principles that encourage the minimum number of operations necessary to complete a task. From an ease-of-use perspective, a single click-and-drag approach to check box lists has several advantages. For example, it is vastly preferable for users with physical impairments that may make repeated selection of items difficult. These include users who have suffered repetitive motion injuries or whose fine motor skills make clicking on individual check box items more difficult. Guidelines from the Human Factors and Ergonomics Society (HFES 200-199X) encourage adoption of interfaces that address keyboard considerations, reduce multiple operations, and identify pointer alternatives, both for users who require assisting devices and those who do not. Even for those users who face no special challenges in pointer operation, this invention greatly reduces the difficulty in selecting multiple items in a check box list.

In summary, this invention turns away from the traditional approach toward check box lists by providing, among other improvement, an option for users to select multiple items with a single click and drag operation, thus facilitating ad hoc selection of computerized data. Many embodiments of this invention are platform independent and suitable for compiled and web-based applications on any operating system.

It will be understood from the foregoing description that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

What is claimed is:

1. A method for toggling check box status,
    the method implemented as a software program installed and operating on a computer comprising a computer processor coupled to computer memory,
    the computer comprising also a computer display which itself further comprises a graphical user interface ("GUI"),
    the method implemented on the GUI, the GUI operated by a user using a pointing device, the pointing device having a capability of indicating a touch on a check box, the pointing device having associated with it through the GUI a pointer displayed upon the GUI and responsive to physical motion of the pointing device,
    the GUI having displayed upon it a set of check boxes comprising a multiplicity of check boxes, wherein each check box has a status comprising an indication whether a check box is selected,
    the method comprising the steps of:
        detecting a touch event on a check box;
        toggling the status of the check box;
        repeatedly, for a multiplicity of repetitions, carrying out the steps of:
            detecting a drag event for each additional check box onto which a user drags the pointer, wherein the user drags the pointer onto at least one additional check box; and
            toggling the status of each additional touch box for which a drag event is detected.

2. The method of claim 1 wherein, for at least a portion of the repetitions, one or more further check boxes are positioned upon the display screen in the GUI between two of the additional check boxes, wherein a path along which the pointer drags between the two additional check boxes lies outside the further check boxes, whereby the statuses of the further check boxes remain unaffected.

3. The method of claim 1 wherein detecting a touch event comprises changing a pointer device status to 'active' while a pointer for the device is positioned on the check box.

4. The method of claim 1 wherein the pointing device is a mouse.

5. The method of claim 1 wherein the pointing device is a stylus pressed upon a touch sensitive pad.

6. The method of claim 1 wherein the pointing device is a finger pressed upon a touch sensitive screen.

7. The method of claim 1 wherein the check box has a GUI image and toggling the status of the check box includes changing the GUI image of the check box to indicate a change in the status of the check box.

8. A method of toggling check box status,
   the method implemented as a software program installed and operating on a computer comprising a computer processor coupled to computer memory,
   the computer comprising also a computer display which itself further comprises a graphical user interface ("GUI"),
   the method implemented on the GUI, the GUI operated by a user using a mouse, the mouse comprising a mouse button, the mouse having associated with it through the GUI a mouse pointer displayed upon the GUI and responsive to physical motion of the mouse,
   the GUI having displayed upon it a set of check boxes comprising a multiplicity of check boxes, wherein each check box has a status comprising an indication whether a check box is selected,
   the method comprising the steps of:
      the user positioning the mouse pointer on a first check box;
      the user depressing the mouse button, wherein results a mouse down event;
      detecting the mouse down event on the first check box;
      toggling the status of the first check box;
      the mouse, at the behest of the user, dragging the mouse pointer along a path on the display screen from the first check box to a second check box;
      detecting a mouse drag event on the second check box; and
      toggling the status of the second check box.

9. The method of claim 1 wherein a third check box is positioned upon the display screen in the GUI at a position between the first check box and the second check box, wherein the path along which the mouse pointer is dragged from the first check box to the second check box lies entirely outside the third check box, whereby the steps of moving the mouse pointer to the second check box, detecting the mouse drag event, and toggling the status of the second check box leave the third check box unaffected.

10. A system for toggling check box status, the system comprising:

a software program installed and operating on a computer comprising a computer processor coupled to computer memory;
   a computer display which itself further comprises a graphical user interface ("GUI");
   the GUI, the GUI operated by a user using a mouse, the mouse comprising a mouse button, the mouse having associated with it through the GUI a mouse pointer displayed upon the GUI and responsive to physical motion of the mouse;
   displayed upon the GUI a set of check boxes comprising a multiplicity of check boxes, wherein each check box has a status comprising an indication whether a check box is selected;
   means for detecting a mouse down event on a check box;
   means for toggling the status of the check box;
   means for displaying upon the GUI the mouse pointer as the mouse pointer drags along a path on the display screen from the check box to an additional check box;
   means for detecting a mouse drag event on the additional check box; and
   means for toggling the status of the additional check box.

11. A computer program product for toggling check box status,
   the computer program product implemented for use as software program for installation and operation on a computer comprising a computer processor coupled to computer memory,
   the computer comprising also a computer display which itself further comprises a graphical user interface ("GUI"),
   the GUI operated by a user using a mouse, the mouse comprising a mouse button, the mouse having associated with it through the GUI a mouse pointer displayed upon the GUI and responsive to physical motion of the mouse,
   the GUI having displayed upon it a set of check boxes comprising a multiplicity of check boxes, wherein each check box has a status comprising an indication whether a check box is selected,
   the computer program product comprising:
      a recording medium;
      means, recorded on the recording medium, for detecting a mouse down event on a check box;
      means, recorded on the recording medium, for toggling the status of the check box;
      means, recorded on the recording medium, for displaying upon the GUI the mouse pointer as the mouse pointer drags along a path on the display screen from the check box to an additional check box;
      means, recorded on the recording medium, for detecting a mouse drag event on the additional check box; and
      means, recorded on the recording medium, for toggling the status of the additional check box.

* * * * *